Figure 1:
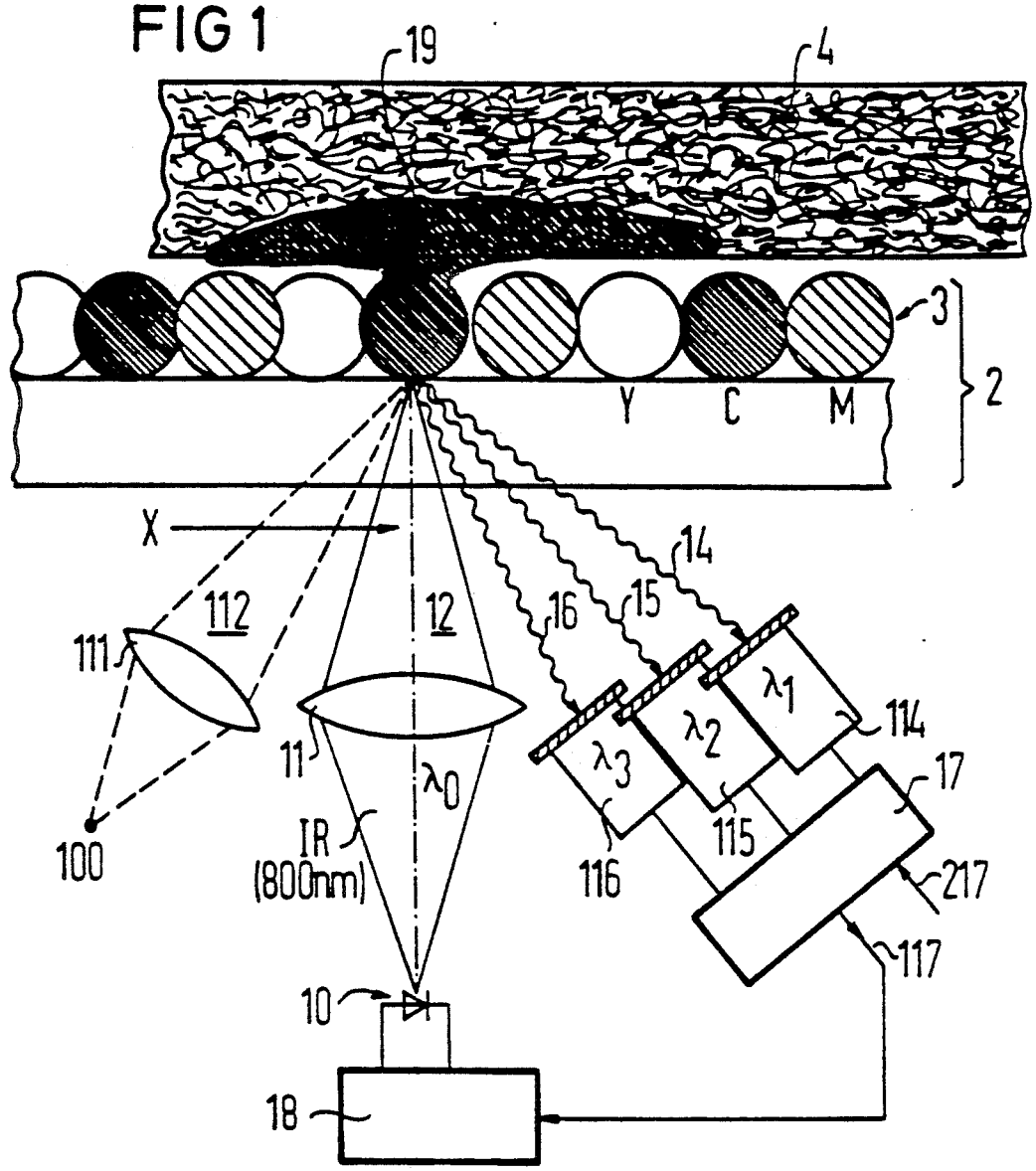

United States Patent [19]
Kleinschmidt et al.

[11] Patent Number: 5,157,412
[45] Date of Patent: Oct. 20, 1992

[54] LASER BEAM-INDUCED COLOR PRINTING

[75] Inventors: Peter Kleinschmidt, Munich; Gerhard Mader, Unterhaching; Hans Meixner, Haar, all of Fed. Rep. of Germany

[73] Assignee: Siemens Aktiengesellschaft, Munich, Fed. Rep. of Germany

[21] Appl. No.: 473,937

[22] PCT Filed: Sep. 19, 1988

[86] PCT No.: PCT/DE88/00582
 § 371 Date: May 22, 1990
 § 102(e) Date: May 22, 1990

[87] PCT Pub. No.: WO89/02832
 PCT Pub. Date: Apr. 6, 1989

[30] Foreign Application Priority Data

Sep. 22, 1987 [DE] Fed. Rep. of Germany ....... 3731835

[51] Int. Cl.$^5$ .................. G01D 9/40; G01D 15/14; G01D 15/16
[52] U.S. Cl. ..................... 346/1.1; 346/76 L
[58] Field of Search ............ 346/76 L, 1.1, 108; 355/27, 67, 68, 32; 430/138

[56] References Cited

U.S. PATENT DOCUMENTS 3,351,948 11/1967 Bonn ................................. 346/76 L
3,842,195 10/1974 Takahashi et al. ................ 346/76 L
4,149,887 4/1979 Levy .

FOREIGN PATENT DOCUMENTS 0279104 8/1988 European Pat. Off. .
2536014 5/1984 France .
2601467 1/1988 France .
60147704 1/1987 Japan .
WO88/07450 10/1988 PCT Int'l Appl. ............... 346/76 L
2113860A 8/1983 United Kingdom .
2173452A 10/1986 United Kingdom .

Primary Examiner—Benjamin R. Fuller
Assistant Examiner—David Yockey
Attorney, Agent, or Firm—Hill, Van Santen, Steadman & Simpson

[57] ABSTRACT

Laser-induced color printing with means with which the printing color of a micro-capsule to be impinged by the laser beam (12) is identified. These means are a fluorescence transformer material as a constituent of the content of the micro-capsules (3) or an additional white light ray with which the printing color of an individual micro-capsule (3) can likewise be identified.

The printing ensues given coincidence of a printing instruction provided for a defined location with color specification and of the momentary incidence of the scanning laser beam (12) on a micro-capsule (3) for which this printing color has been identified as being present.

4 Claims, 1 Drawing Sheet

LASER BEAM-INDUCED COLOR PRINTING

The present invention is directed to a method and system for laser beam induced color printing using micro encapsulated colorants or coloring forming agents.

GB-A-2 173 452 discloses an apparatus and a method for laser printing. A printing medium, for example a sheet of paper, is thereby employed whose surface is coated with what are referred to as micro-capsules. A special paper is thus required here in order to carry out the color printing.

These micro-capsules contain an ink employed as printing ink. As soon as such a micro-capsule is struck by the radiation of a laser of the printing equipment, this capsule is broken insofar as the incident laser beam has a certain, prescribed minimum energy. It can be provided that the ink contained in the capsule is absorbent for this laser emission such that the laser beam energy is absorbed by this ink. An alternative thereto is that the material of the wall of the capsule has such laser emission absorption. As an auxiliary, it can be provided that a respective micro-capsule additionally contains an absorber substance.

The absorbed laser emission energy effects that a respective micro-capsule bursts and the colored ink contained therein thus proceeds onto the paper as printing ink. A reinforcing effect in view of the effectiveness of the laser emission can be provided, namely, that a respective micro-capsule (additionally) and/or the material of the wall of the micro-capsule contains a substance that allows such a chemical reaction to occur upon incidence of the laser emission that effects or at least promotes the bursting of the capsules.

Such a laser printing method can be implemented in such fashion without employing printing character masks that the individual letters are composed matrix-like point-by-point by the correspondingly driven, focussed laser beam.

Multi-color printing employs micro-capsules that, arranged appropriately distributed, contain one of the respective printing inks provided. The colorants cyan, magenta and yellow and, potentially black in addition are therefore usually employed for this purpose.

U.S. Pat. No. 3,351,948 discloses a multi-color printing method with micro-capsules wherein it is provided that the micro-capsules of a respective color are arranged in a row. Dependent on whether a pure color or a secondary color is to be printed, one or more of these neighboring rows must then be impinged by the printing laser beam for a printing point in multi-color printing.

The earlier patent application that does not enjoy prior publication discloses a laser transfer printing method wherein the micro-capsules having the various colorants are situated as a layer on an inking ribbon similar to an inking ribbon disclosed by U.S. Pat. No. 3,570,380 having micro-capsules with uniform printing colorant for black-white printing.

The problem of exact congruency of the chromatic images of the various primary colors exists for multi-color printing in the appertaining, known apparatus and methods, namely in order to achieve a sharp image and/or printed points with correct secondary color. The mutual adjustment of a plurality of laser beam sources is thereby a problem.

Given the otherwise advantageous employment of a static distribution of the micro-capsules of different colors, it is not possible to identify the different colors or, respectively, the positions of their capsules. In this case, three different laser wavelengths are employed for which absorber substances matching the different wavelengths must be selectively present in the capsules.

An object of the present invention is to specify a principle with which laser beam-induced color printing can be implemented without lasers of different wavelengths having appertaining absorber materials being necessary (and having to be correspondingly adjusted).

In a first modification, this object is achieved by a laser beam induced color printing system using a laser beam source of only one wavelength for producing a focussed laser beam, the micro-capsules of a respective color also containing a means having a fluorescent transformer property that is selected so that it converts radiation of the frequency of the laser emission source into radiation having a fluorescence frequency differing from this frequency, a means having this fluorescence transformer property whose fluorescence frequency differs from those means that are allocated to the other printing colors is provided for each of the colors, the appertaining printing equipment having a plurality of frequency selective radiation detectors corresponding in number to the number of printing colors, each of the frequency selective radiation detectors being tuned to one of the fluorescence frequencies, given reception of fluorescent radiation by one of the radiation detectors, this detector outputs an output signal that indicates the printing color of the micro-capsule being momentarily selected by the laser beam, a logic circuit provided which, dependent on the momentary point of incidence of the focus laser beam, supplies an output signal given coincidence of a printing instruction for a defined printing color forwarded to the logic circuit and a signal of the detector for this defined printing color of the printing capsule momentarily impinged by the laser beam, and the pulsed elevation of the laser beam energy or intensity being effective by this output signal so that bursting of the micro-capsule of the appertaining printing color ensures. This object is also achieved by a second modification of the invention wherein a laser beam induced color printing includes a laser beam source of only one wavelength for producing a focussed laser beam, a source for a focussed light ray of white light to momentarily impinge a micro-capsule to cause a reflection of light of the printing color capsule, the white light ray and the focussed laser beam being deflected so that both rays essentially impinge the same micro-capsule in focussed fashion, the printing equipment having a plurality of frequency selective radiation detector corresponding in number to the number of printing colors, the frequency selective radiation detectors being tuned out discriminating the printing colors, given reception of a reflection by one of the radiation detectors, the detector outputting an output signal that indicates the printing color of the momentarily impinged micro-capsule, a logic circuit that, dependent on the momentary incidence of the focussed rays, supplies an output signal given coincidence of a printing instruction for a defined printing color forwarded to the logic circuit and a signal of the detector of this defined printing color of the momentarily impinged printing capsule, and a pulsed elevation of the laser beam energy of intensity being effected with this output signal so that bursting of the micro-capsule having the appertaining printing color ensues.

The present invention is based on the idea of finding and employing a physical principle with which it is possible to recognize which colorant is contained in a micro-capsule that is the only one currently "driven" by the laser beam of the single laser beam source employed. It is provided for the invention that the layer of micro-capsules be scanned with a well-focussed laser beam in line-by-line fashion, grid-wise and the like. When it is found that a micro-capsule of the prescribed color is present at a location allocated to a specific printing point of the printing master that is currently impinged by the focussed laser beam, an answerback ensues from this one micro-capsule to a detector system whose detector signal is used to now key the laser beam to such a high energy at this moment that a bursting of this one micro-capsule ensues. For a secondary color, this process is allowed to sequence appropriately time-offset somewhat for the one and for the other of the primary colors participating therein; after the detection and bursting of the one micro-capsule, namely, the next capsule of the other color is allowed to burst after it has been detected.

Expressed in other words, what the invention involves is to sweep the printing surface with a laser beam, namely with a laser beam having an energy that is still inadequate to cause one of the micro-capsules to burst. When printing is to be carried out with the color cyan at a specific location, for example, a printing point, then it is precisely this laser beam that "interrogates" the layer of micro-capsules to find out which micro-capsule present at the location of this printing point contains the colorant cyan. When the secondary color of cyan/magenta is to be printed, a search is made for a printing capsule having cyan and for a printing capsule having magenta. As standard for printing methods having micro-capsules, the size of the micro-capsules is so small and their distribution is so fine that micro-capsules of the individual colors are available at every prescribed printing point in a proximity that is adequate for the printing precision, these micro-capsules then being burst by the laser beam after identification of those micro-capsules in which the correct colorant is present.

The problem of recognizing which of the micro-capsules requires the printing colorant required at the moment is inventively achieved in the first modification in that the micro-capsules contain fluorescence transformers. Such a fluorescence transformer is a substance or, respectively, a means that, on the basis, for example, of Stokes or anti-Stokes processes, converts light, namely the incident laser beam, into returned or, respectively, back-scattered (fluorescence) radiation that has a different wavelength or, respectively, frequency. It is inventively provided that a fluorescence transformer that effects the conversion into a first frequency is contained in the capsules of the one printing ink (for example, cyan). Micro-capsules of a different colorant (for example, magenta) contain a fluorescence transformer that effects conversion into a different, second frequency. The analogous case is provided for the third colorant and for a fourth colorant (black) that may be potentially provided. The material of the wall of the micro-capsules is selected such that these fluorescence processes occur and the fluorescence radiation that is generated can emerge from the capsule.

The laser beam is so finely focussed that it essentially impinges only a single micro-capsule at a defined moment. A laser beam intensity or, respectively, energy that does not yet allow such a micro-capsule to burst is thereby (initially) present. Via the fluorescence transformer, this micro-capsule signals which colorant (for example, cyan) is contained in it. The fluorescence transformer supplies the fluorescence signal having the first frequency or, respectively, wavelength that is received by a correspondingly selective, additionally provided detector and is converted into an output signal. Further, corresponding detectors that are present do not deliver an output signal at this moment. These only deliver an output signal when a micro-capsule of the printing ink (magenta, yellow . . . ) allocated to them is momentarily driven with the laser beam and the corresponding fluorescence radiation arises.

When a printing point having, for example, the color cyan is to be printed at a given location at which the laser beam is still momentarily impinging with low laser beam energy, then the appertaining fluorescence signal having the first frequency (cyan) is detected by the appertaining detector at the moment at which the laser beam in fact impinges a "cyan" micro-capsule, i.e. simultaneously, and this fluorescence signal is converted into an output signal in response to whose appearance the laser beam is keyed to high energy. This "cyan" micro-capsule is thus caused to burst and the "cyan" printing point is produced on the paper. The analogous case applies to printing points having the other colorants and also analogously applies to printing points having secondary colors. When, for example, a printing point having the secondary color of cyan/magenta is to be printed, the laser beam is keyed to high energy in pulsed fashion at respectively precisely the point when the one detector for fluorescence radiation of the micro-capsules having the one component of the secondary color supplies its output signal, namely, corresponding to the incidence onto a micro-capsule of this color, and the laser beam is again keyed to high energy as soon as (i.e. practically immediately thereafter) the selective detector of the other component of the secondary color signals with its output signal that the laser beam (that is still at low energy) is just now impinging a micro-capsule having this other printing ink.

Instead of a respective, finished printing colorant in a micro-capsule, it can be alternatively provided that an inherently known combination of colorant coupler and colorant precursor is employed [therein]. For example, the colorant coupler can be present in the respective micro-capsule and the precursor can be present in the layer wherein the capsules are embedded. As inherently known, the colorant arises when the coupler is released, i.e. after the bursting of the respective micro-capsule.

The present invention can be applied to laser transfer printing wherein an inking ribbon that contains a layer of the micro-capsules under discussion is employed. However, the invention can also be employed in a method wherein the micro-capsules are used in the fashion of a toner, as adequately known for toners in conjunction with electrostatic copying. For this alternative embodiment, a layer of the micro-capsules provided for the invention that contain the respective fluorescence transformers is first applied onto the printing paper and the appertaining area is then scanned point-by-point with the focussed laser beam in accord with the above explanations. When a defined color is to be printed and when the answerback "a micro-capsule having the appertaining colorant is present here" is present for the momentary location of the incidence of the laser beam, the printing ensues by pulsed keying of the laser beam to high energy. Micro-capsules that are not used for printing are subsequently removed and can be re-employed.

It can be provided in the invention that the printing area be scanned gap-free. Under computer control, it can also be provided that only those locations at which a printing event is to be in fact carried out are selected with the laser beam. The printing operation can be carried out with a corresponding time saving on the basis of this measure.

Further explanations proceed from the description of an exemplary embodiment provided with reference to the Figures.

Figure 2:
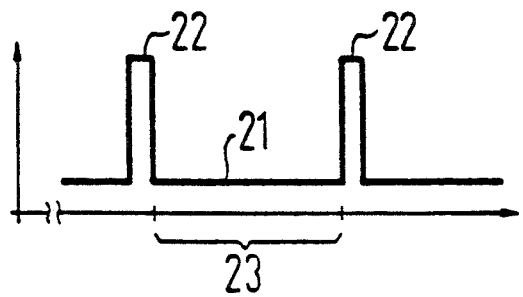

FIG. 1 is a schematic representation of a color printing system according to the principles of the present invention; and FIG. 2 is a signal diagram of laser intensity over time.

2 references a transfer ribbon coated with a layer 3 of micro-capsules. Micro-capsules having the colorant cyan (C), the colorant magenta (M) and the colorant yellow (Y) are shown. 4 references a sheet of paper.

10 references a laser diode that serves as a laser emission source. The laser beam focussed with the assistance of optics 11 is referenced 12. In the Figure, it is momentarily impinging a micro-capsule having the colorant cyan (C).

As set forth above, the laser beam 12 when merely scanning the layer of micro-capsules 3 initially has only such a low energy that adequate fluorescence radiation can be generated by the fluorescence transformer contained in the appertaining micro-capsule 3. 14 references fluorescence radiation of that wavelength or, respectively, frequency that corresponds to the fluorescence transformer that is contained in each and every micro-capsule 3 having the colorant cyan (C). Further fluorescence radiations 15 and 16 are merely indicated in broken lines, these corresponding to fluorescence transformers that correspond to the micro-capsules 3 having the colorant magenta (M) and, respectively, the micro-capsules 3 having the colorant yellow (Y). Fluorescence radiations 15 and 16 cannot occur given incidence of the laser beam 12 only onto a micro-capsule having the colorant cyan. Accordingly, it is only the detector 114 that supplies an output signal to the logic circuit 17 that in turn forwards a control signal to the driver stage 18. A decision is made in the logic circuit 17 whether a printing event is to be triggered in response to the appearance of a fluorescence radiation 14, namely, whether a printing point having the color cyan is to be produced. The illustration of the Figure provides that this is indeed the case. The signal supplied to the driver stage 18 effects that the driver stage keys the laser diode 10 to high power. A laser beam 12 that now has this high power effects the bursting of the micro-capsule 3 and produces the colored printing point 19 shown in FIG. 1 on or, respectively, in the paper 4.

In a diagram (ordinate=laser intensity; abscissa=time), FIG. 2 shows this execution, namely the momentary laser intensity entered over the time. The laser intensity 21 corresponds to the time phase after interrogation. The laser intensity 22 is the working intensity that is required for generating a printing event (as shown in FIG. 1).

If the color magenta should have been printed in the region of the printing point 19 instead of the color cyan, the logic 17 would (only) have triggered the printing event in response to the printing instruction 217 when, corresponding to the shift x, the scanning, focussed laser beam 12 impinged the (neighboring) micro-capsule 3 having the colorant magenta (M). The time at which this has occurred is signaled by the reception of the fluorescence radiation 15 of the fluorescence transformer allocated to the colorant "magenta" that is contained in a "magenta" micro-capsule.

The second alternative solution of patent claim 2 is fundamentally comprised in cancelling the requirement of the fluorescence transformers by employing an additional light ray having white light. Given irradiation of the micro-capsules filled with printing colorant of the respective color with white light, these reflect a radiation of that color that corresponds to the color of the printing colorant of the respective, individual micro-capsules. The printing color of the individual micro-capsules can thus be interrogated with the white light.

Given employment of cyan, magenta, and yellow printing inks, namely inks that themselves are not one of the primary colors red, green, blue but are corresponding secondary colors, the detectors 114, 115, 116 are to be correspondingly selected in terms of their frequency selectivity. This, however, is no problem for a person skilled in the art.

With the addition of a source 100 (shown with broken lines) for a focussed, white light ray 112, FIG. 1 also shows an exemplary embodiment of this second alternative. The white light ray is deflected synchronously with the deflection of the laser beam 12 and in congruence therewith with respect to the incidence onto the layer of micro-capsules 3. The remaining procedures of the two alternatives 1 and 2 are identical or at least analogous.

Congruent deflection of light ray 112 and laser beam 12 can be provided with respect to the incidence onto a respective micro-capsule 3. Instead, the deflection can also be undertaken such that a prescribed spacing of the following rays 112 and 12 is always present. The chronological spacing of the incidence of the laser beam 12 in comparison to the incidence of the white ray 112 that corresponds to this topical spacing must then be taken into consideration in view of the "coincidence", namely so that the pulsed elevation of the laser energy of the laser beam 12 ensues exactly at that time at which this laser beam impinges that defined micro-capsule 3 (having the appertaining printing color) that had been previously identified with the assistance of the white light ray as a micro-capsule of this printing color (at the location at which the printing is to ensue).

Let the following also be pointed out with respect to the detectors: the chromatic effect of the printing colors cyan, magenta and yellow is based on frequency-dependent reflectivity. Cyan reflects blue and green and absorbs red. This yields the color blue-green of the cyan. In accord with a first alternative, the detector for capsules having the colorant cyan must respond to these two colors, blue and green. The analogous case is valid for the detectors of the other colorants, magenta and yellow. Another, second alternative is to employ three detectors whereof the one is sensitive for blue, the other is sensitive for green and the third is sensitive for red. A logic operation of these detectors is then carried for detecting the color of the cyan. The detectors for blue and green respond to cyan, in contrast whereto the detector for red does not output a signal given cyan. The analogous case is valid for the other colorants.

Although other modifications and changes may be suggested by those skilled in the art, it is the intention of the inventors to embody within the patent warranted hereon all changes and modifications as reasonably and properly come within the scope of their contribution to the art.

We claim:

1. A laser beam-induced color printing system for use in printing equipment and using micro-capsules containing printing inks, a selected one of said micro-capsules bursting upon application of laser beam energy of a focussed laser beam directed thereonto and, thus, effecting a corresponding colored printing point on a print medium, comprising:

a laser beam source producing said focussed laser beam, said focussed laser beam being of at least one wavelength;

said micro-capsules including printing inks of a plurality of printing colors.

ones of said micro-capsules that include one of said printing inks of a first printing color further including a first means having a fluorescence transformer property for converting said laser beam energy into radiation having a first fluorescence frequency differing from said at least one wavelength, other ones of said micro-capsules that include other ones of said printing inks of a second printing color further including a second means having a fluorescence transformer property for converting said laser beam energy into a second fluorescence frequency differing from said at least one wavelength and from said first fluorescence frequency;

a plurality of frequency-selective radiation detectors in the printing equipment corresponding in number to said plurality of printing colors, each of said plurality of frequency-selective radiation detectors being tuned to one of said first and second fluorescence frequencies, one of said plurality of frequency-selective radiation detectors outputting a detector output signal upon reception of said fluorescence frequency to which said one of said frequency-selective radiation detectors is tuned so that said detector output signal indicates which of said first and second printing colors of said printing inks is included in one of said micro-capsules to which said laser beam is momentarily applied;

a logic circuit connected to said plurality of frequency-selective radiation detectors and connected to receive printing instructions from the printing equipment that, dependent on said momentary application of said focussed laser beam on said one of said micro-capsules, supplies a print signal given coincidence of one of said printing instructions for a defined printing color forwarded to said logic circuit and a detector signal from one of said plurality of frequency-selective radiation detectors corresponding to said printing color of said one of said printing inks included in said micro-capsule onto which said laser beam is momentarily applied; and said laser beam source being connected to receive said print signal from said logic circuit so that a pulsed elevation of said laser beam energy or intensity is effected so that a bursting of said micro-capsule effects a corresponding colored printing point on said print medium.

2. A color printing system according to claim 1, further comprising:

means for printing a secondary color formed by color components including means for successively causing neighboring micro-capsules having color components of said secondary color to burst given coincidence of, first, fluorescent radiation that indicates one color component of said secondary color and followed by fluorescent radiation of another color component of said secondary color and, second, of a printing instruction for printing of said secondary color or for printing of said color components of said secondary color.

3. A laser beam-induced color printing method using micro-capsules containing colorant or colorant-forming agents, a selected one of said micro-capsules bursting upon application of laser beam energy of a focussed laser beam directed thereonto and thus effecting a corresponding color printing point on a print medium, comprising the steps of:

focussing a laser beam of at least one wavelength from a laser beam source to produce said focussed laser beam;

focussing a white light from a white light source to produce a white light ray with which a reflection of light of a printing color corresponding to said colorant or colorant-forming agents of one of said micro-capsules momentarily impinged by said white light ray ensues;

deflecting said white light ray and said focussed laser beam such that both said white light ray and said focussed laser beam substantially impinge a same one of said micro-capsules in focussed fashion;

receiving said reflection of light using a plurality of frequency-selective radiation detectors corresponding in number to a plurality of printing colors of said colorant or colorant-forming agents, said frequency-selective radiation detectors being tuned for discriminating said plurality of printing colors;

discriminating one of said plurality of printing colors in said reflection of light by one of said radiation detectors;

outputting a first output signal from said one of said radiation detectors, said first output signal being indicative of which one of said plurality of printing colors of said colorant or colorant-forming agents is contained in said same one of said micro-capsules onto which said white light ray is deflected;

generating a second output signal from a logic circuit, dependent on a momentary deflection of said white light ray and said focussed laser beam onto said same one of said micro-capsules and given coincidence of a printing instruction for a defined printing color forwarded to said logic circuit and said first output signal of said one of said radiation detectors which detects said defined color;

pulsing an elevation of energy or intensity of said focussed laser beam with said second output signal, so that a bursting of said same one of said micro-capsules ensues.

4. A method according to claim 3, wherein the step of deflecting includes the substep of:

deflecting said white light ray and said laser beam onto a same one of said micro-capsules at a prescribed chronological spacing from one another.

* * * * *